(12) United States Patent
Bishara

(10) Patent No.: US 8,605,727 B1
(45) Date of Patent: *Dec. 10, 2013

(54) EFFICIENT IP MULTICAST BRIDGING IN ETHERNET SWITCHES

(75) Inventor: Nafea Bishara, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 140 days.

This patent is subject to a terminal disclaimer.

(21) Appl. No.: 13/185,231

(22) Filed: Jul. 18, 2011

Related U.S. Application Data

(63) Continuation of application No. 12/559,969, filed on Sep. 15, 2009, now Pat. No. 7,983,262, which is a continuation of application No. 10/773,474, filed on Feb. 5, 2004, now Pat. No. 7,590,114.

(60) Provisional application No. 60/457,397, filed on Mar. 24, 2003.

(51) Int. Cl.
*H04L 12/28* (2006.01)

(52) U.S. Cl.
USPC .......................................... 370/392; 370/401

(58) Field of Classification Search
USPC .................. 370/389–392, 400, 401
See application file for complete search history.

(56) References Cited

U.S. PATENT DOCUMENTS

| | | | |
|---|---|---|---|
| 5,982,775 A * | 11/1999 | Brunner et al. ............... | 370/401 |
| 6,339,791 B1 | 1/2002 | Dumortier et al. | |
| 6,457,059 B1 * | 9/2002 | Kobayashi ..................... | 709/242 |
| 6,553,028 B1 * | 4/2003 | Tang et al. ..................... | 370/389 |
| 6,950,431 B1 * | 9/2005 | Nozaki et al. ................. | 370/390 |
| 7,009,968 B2 * | 3/2006 | Ambe et al. ................... | 370/389 |
| 7,046,679 B2 | 5/2006 | Sampath et al. | |
| 7,050,430 B2 * | 5/2006 | Kalkunte et al. .............. | 370/389 |
| 7,099,317 B2 * | 8/2006 | Ambe et al. ................... | 370/389 |
| 7,134,012 B2 | 11/2006 | Doyle et al. | |
| 7,139,269 B2 * | 11/2006 | Kalkunte et al. .............. | 370/389 |
| 7,389,359 B2 | 6/2008 | Jain et al. | |
| 2002/0009081 A1 * | 1/2002 | Sampath et al. ............... | 370/389 |
| 2002/0012345 A1 * | 1/2002 | Kalkunte et al. .............. | 370/389 |
| 2003/0026252 A1 | 2/2003 | Thunquest et al. | |
| 2003/0043853 A1 * | 3/2003 | Doyle et al. .................. | 370/489 |
| 2003/0079040 A1 * | 4/2003 | Jain et al. ....................... | 709/238 |
| 2005/0249213 A1 * | 11/2005 | Higuchi et al. ................ | 370/390 |

FOREIGN PATENT DOCUMENTS

WO    WO 00/56018    9/2000

* cited by examiner

*Primary Examiner* — Hong Cho

(57) ABSTRACT

A system including a memory configured to store a bridge table, in which the bridge table includes an entry associating each of an Internet Protocol multicast destination address and an Internet Protocol source address with a port indicator, and the port indicator identifies one or more ports of a switch. The system further includes a controller configured to, in response to the switch receiving an Ethernet packet comprising an Internet Protocol multicast packet, i) generate a key based on each of an Internet Protocol multicast destination address and an Internet Protocol source address associated with the Ethernet packet, ii) lookup the bridge table using the key, and iii) flood the Ethernet packet to the one or more ports identified by the port indicator in response to confirming, based on the key, that the entry in the bridge table is an Internet Protocol multicast entry.

14 Claims, 2 Drawing Sheets

EFFICIENT IP MULTICAST BRIDGING IN ETHERNET SWITCHES

CROSS-REFERENCE TO RELATED APPLICATIONS

This present disclosure is a continuation of U.S. application Ser. No. 12/559,969, filed Sep. 15, 2009 (now U.S. Pat. No. 7,983,262), which is a continuation of U.S. application Ser. No. 10/773,474 (now U.S. Pat. No. 7,590,114), filed Feb. 5, 2004, which claims priority under 35 U.S.C. §119 (e) to U.S. Provisional Application No. 60/457,397, filed on Mar. 24, 2003.

BACKGROUND

The present invention relates generally to data communications. More particularly, the present invention relates to multicast bridging in network switches.

A packet in a packet-switching network such as an Ethernet network can be sent in one of three ways: unicast, multicast, and broadcast. A unicast packet is directed to a single port. A broadcast packet is directed to all of the ports of the network. A multicast packet is directed to a group of the ports of the network. Multicast packets can be either link-layer multicast packets, such as media access control (MAC) multicast packets, or Internet Protocol (IP) multicast packets.

Ethernet switches compliant with the IEEE 802.1D-1998 specification are required to switch MAC multicast packets based on the destination MAC address of the packet. Ethernet switches compliant with the IEEE 802.1D-1998, 802.1p and 802.1q specifications are required to switch MAC multicast packets based on the destination MAC address and Virtual Local Area Network (LAN) Identifier (VLAN ID) of the packet. Such switches comprise forwarding databases (FDB) that associate each MAC address (or MAC address and VLAN ID combination) with one or more of the ports of the switch.

However, most multicast packets are IP multicast packets, which should be flooded according to the source IP address and IP multicast destination (also referred to as IP multicast group). The Internet Engineering Task Force (IETF) mandates that IP multicast traffic should be encapsulated in a link-layer MAC multicast packet when sent over Ethernet. Unfortunately, Ethernet switches handle IP multicast packets inefficiently, without regard to the source IP address, according to the MAC destination address only. And because a MAC destination address can map to more than one IP multicast group (32 unique IP multicast addresses map to each MAC multicast address), an IP multicast packet is often flooded to more than one IP multicast group, causing unnecessary network traffic, security breaches, and switch workload.

For example, consider a switch having four ports p1, p2, p3, and p4. Assume that two IP multicast groups, IPMG1 and IPMG2, are mapped to a single MAC multicast destination address MMDA, that IP multicast group IPMG1 is mapped to ports p1 and p2, and that IP multicast group IPMG2 is mapped to ports p3 and p4. Therefore MAC multicast destination address MMDA is mapped to all four ports. When an IP multicast packet arrives for IP multicast group IPMG1, it is flooded not only to ports p1 and p2, but also to ports p3 and p4. Similarly, IP multicast packets for IP multicast group IPMG2 are flooded to all four ports.

A similar problem occurs in Ethernet switches that comply with the Internet Group Membership Protocol (IGMPv3). According to the IGMP protocol, a port can ask to receive all of the traffic sent from an IP source address to an IP multicast destination address. However, because Ethernet switches forward IP multicast packets without regard to the source IP address, the port will receive all of the traffic sent to that IP multicast destination address from any IP source address, thus unnecessarily burdening the port and the network.

SUMMARY

In general, in one aspect, the invention features a method, apparatus, and computer program. The apparatus comprises a plurality of ports each adapted to receive Ethernet packets; and a data-link layer switch controller, when one of the Ethernet packets comprises an Internet protocol (IP) multicast packet comprising an IP multicast destination address and an IP source address, to select one or more of the ports based upon the IP multicast destination address and the IP source address; wherein the selected one or more ports transmit the Ethernet packet.

Particular implementations can include one or more of the following features. The IP multicast packet comprises a virtual local area network identifier (VLAN ID); and the data-link layer switch controller, is further to select the one or more of the ports based upon the IP multicast destination address, the IP source address, and the VLAN ID. The apparatus further comprises a memory to store associations between IP addresses and the ports; wherein, to select one or more of the ports based upon the IP multicast destination address and the IP source address, the data-link layer switch controller is further to select the one or more of the ports based upon the associations stored in the memory. To select one or more of the ports based upon the IP multicast destination address and the IP source address, the data-link layer switch controller is further to identify one of the associations stored in the memory based on the IP multicast destination address and the IP source address; and to confirm the association is an association between an IP address and the ports. To identify one of the associations stored in the memory based on the IP multicast destination address and the IP source address, the data-link layer switch controller is further to generate a key based on the IP multicast destination address and the IP source address; and to identify the one of the associations based on the key. To confirm the association is an association between an IP address and the ports, the data-link layer switch controller is further to determine whether the association is marked as an IP multicast association. To determine whether the association is marked as an IP multicast association, the data-link layer switch controller is further to determine whether a flag stored in the memory and corresponding to the association is set. The data-link layer switch controller, when the data-link layer switch controller cannot identify one of the associations stored in the memory based on the IP multicast destination address and the IP source address, is further to generate a message requesting the creation of an association for the IP multicast destination address and the IP source address. The data-link layer switch controller, when the data-link layer switch controller cannot identify one of the associations stored in the memory based on the IP multicast destination address and the IP source address, is further to transmit the Ethernet packet from the ports as destination unknown. The apparatus further comprises a central processing unit to create the association for the IP multicast destination address and the IP source address. The data-link layer switch controller, when one of the Ethernet packets comprises a Media Access Control (MAC) multicast packet comprising a MAC multicast destination address and does not comprise an IP multicast packet, is further to select one or more of the ports based upon the MAC multicast destination address;

wherein the selected one or more ports transmit the Ethernet packet. The MAC multicast packet comprises a virtual local area network identifier (VLAN ID); and the data-link layer switch controller, is further to select the one or more of the ports based upon the MAC multicast destination address and the VLAN ID. The apparatus further comprises a memory to store associations between MAC addresses and the ports; wherein, to select one or more of the ports based upon the MAC multicast destination address, the data-link layer switch controller is further to select the one or more of the ports based upon the associations stored in the memory. To select one or more of the ports based upon the MAC multicast destination address, the data-link layer switch controller is further to identify one of the associations stored in the memory based on the MAC multicast destination address; and to confirm the association is an association between a MAC address and the ports. To identify one of the associations stored in the memory based on the MAC multicast destination address, the data-link layer switch controller is further to generate a key based on the MAC multicast destination address; and to identify the one of the associations based on the key. To confirm the association is an association between a MAC address and the ports, the data-link layer switch controller is further to determine whether the association is marked as a MAC multicast association. To determine whether the association is marked as a MAC multicast association, the data-link layer switch controller is further to determine whether a flag stored in the memory and corresponding to the association is clear. The apparatus further comprises a memory to store a bridge table comprising a plurality of entries each identifying one or more of the ports and addressable by a key; wherein, to select one or more of the ports based upon the IP multicast destination address and the IP source address, the data-link layer switch controller is further to generate the key based upon the IP multicast destination address and the IP source address; wherein, to select one or more of the ports based upon the MAC multicast destination address, the data-link layer switch controller is further to generate the key based upon the MAC multicast destination address; and wherein the selected ports are the ports identified by the bridge table entry addressed by the key. An integrated circuit comprises the apparatus. An Ethernet switch comprises the apparatus.

The details of one or more implementations are set forth in the accompanying drawings and the description below. Other features will be apparent from the description and drawings, and from the claims.

Figure 1:
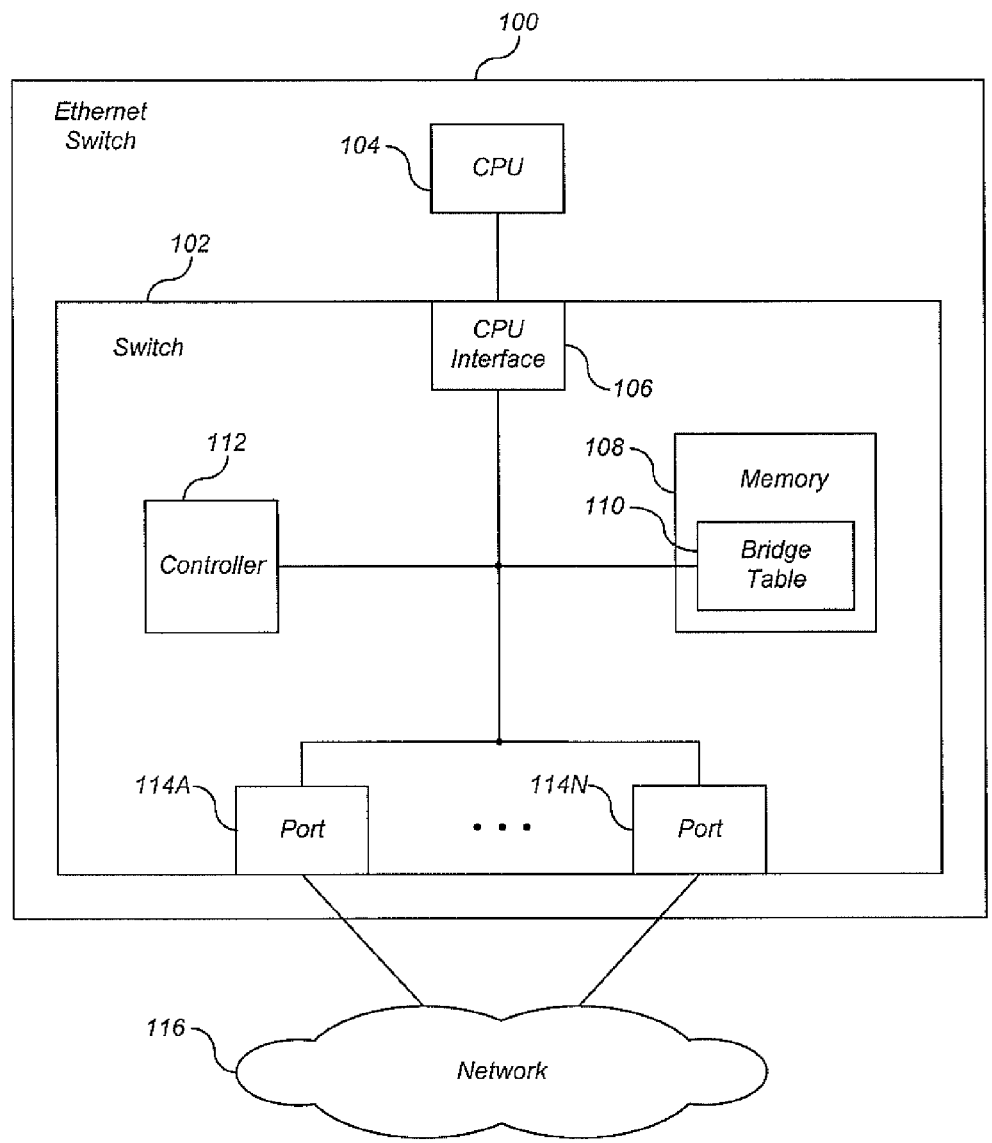
FIG. 1 shows an Ethernet switch according to a preferred embodiment of the present invention.

The leading digit(s) of each reference numeral used in this specification indicates the number of the drawing in which the reference numeral first appears.

DETAILED DESCRIPTION

Embodiments of the present invention comprise a data-link layer (that is, Open Systems Interconnection (OSI) layer 2) switch controller capable of flooding Ethernet packets encapsulating Internet Protocol (IP) multicast packets based on the IP multicast destination address and IP source address. In contrast to network layer (that is, OSI layer 3) and multi-layer switch controllers, data-link layer switch controllers do not execute network layer protocols, as is well-known in the relevant arts. Further, while network layer and multi-layer switch controllers require separate dedicated network-layer forwarding databases, a link-layer switch controller requires only a bridge table. Embodiments of the data-link layer switch controllers according to the present invention are able to flood Ethernet packets encapsulating IP multicast packets based on the IP multicast destination address and IP source address using the same bridge table that is used for Ethernet bridging.

When an Ethernet packet is received, the switches of the present invention determine whether the Ethernet packet comprises an IP multicast packet. If so, the switch determines whether the bridge table in the switch contains an entry for the IP multicast destination address and IP source address. If so, the switch floods the Ethernet packet according to that entry. If the IP multicast packet also comprises a virtual local area network identifier (VLAN ID), the switch floods the Ethernet packet according to the IP multicast destination address, the IP source address, and the VLAN ID. But if the bridge table does not contain an entry for the IP multicast destination address and IP source address, the switch optionally sends a message to the central processing unit (CPU) in the switch to request that an entry in the bridge table be created.

The Ethernet switch is also capable of flooding Ethernet packets encapsulating Media Access Control (MAC) multicast packets that do not encapsulate IP multicast packets based on the MAC multicast destination address in the MAC multicast packet. When an Ethernet packet is received, the switch determines whether the Ethernet packet comprises a MAC multicast packet that does not encapsulate a IP multicast packet. If so, the switch determines whether the bridge table in the switch contains an entry for the MAC multicast destination address in the MAC multicast packet. If so, the switch floods the Ethernet packet according to that entry. If the MAC multicast packet also comprises a virtual local area network identifier (VLAN ID), the switch floods the Ethernet packet according to the MAC multicast destination address and the VLAN ID.

FIG. 1 shows an Ethernet switch 100 according to a preferred embodiment of the present invention. Ethernet switch 100 comprises a switch 102, which can be fabricated as a single integrated circuit, and a central processing unit (CPU) 104. Switch 102 comprises a controller 112 and a CPU interface 106 to permit controller 112 to communicate with CPU 104. Switch 102 also comprises a plurality of ports 114A through 114N for exchanging Ethernet packets of data with a network 116 under the control of controller 112 and according to the contents of a bridge table 110 stored in a memory 108.

Figure 2:
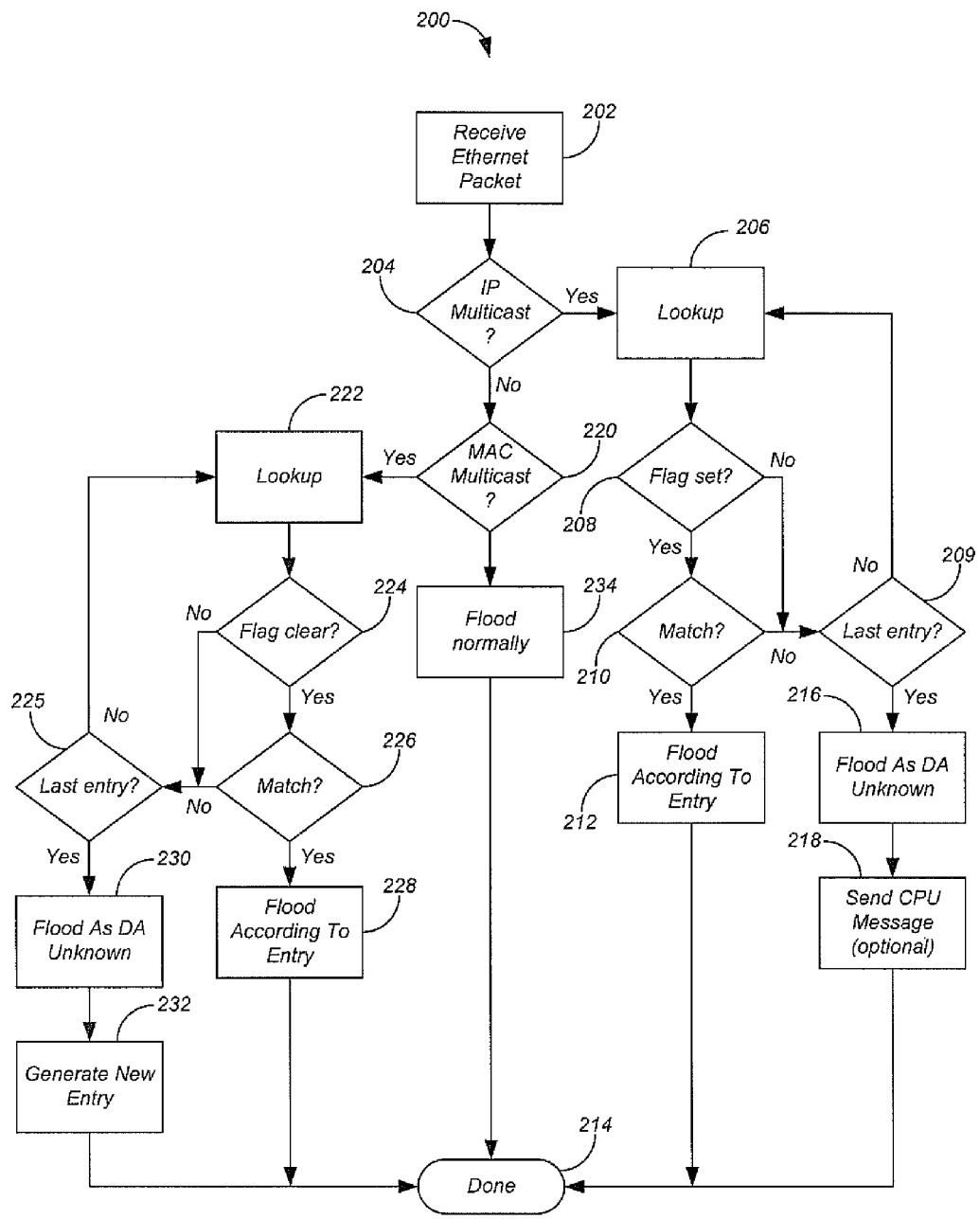
FIG. 2 shows a forwarding process for the switch of FIG. 1 according to a preferred embodiment of the present invention.

FIG. 2 shows a forwarding process 200 for the controller 112 of the switch 102 of FIG. 1 according to a preferred embodiment of the present invention. Process 200 begins when switch 102 receives an Ethernet packet (step 202). Controller 112 determines whether the Ethernet packet comprises an IP multicast packet (step 204) according to conventional techniques, preferably by examining the contents of the packet for a known bit pattern that identifies the packet as an IP multicast packet.

If the Ethernet packet comprises an IP multicast packet, then controller 112 generates a key based on the IP multicast destination address, IP source address, and if present, VLAN ID in the IP multicast packet and performs a lookup (step 206) on bridge table 110 using the key, which can be generated according to conventional techniques, for example by hashing the IP multicast destination address, IP source address, and if present, VLAN ID using a hash function.

Controller 112 then confirms that the entry in bridge table 110 indicated by the key is an IP multicast entry (step 208). Each entry in bridge table 110 includes an IP multicast flag that, if set, marks the entry as an IP multicast entry. Each IP multicast entry contains an association between an IP multicast destination address, an IP source address, an optional VLAN ID, and a port indicator that identifies one or more of the ports 114. The port indicator can be a vector comprising a bit representing each port 114, a list of identifiers of one or more ports 114, a pointer to such a port vector or port list, or the like.

If in step 208 controller 112 finds the IP multicast flag in the entry is set, then controller 112 determines whether the IP multicast destination address, the IP source address, and if present, VLAN ID in the entry match the IP multicast destination address, IP source address, and if present, VLAN ID in the IP multicast packet (step 210). If they match, then controller 112 floods the Ethernet packet according to the port indicator in the entry (step 212), and process 200 is done (step 214).

However, if in step 208 the IP multicast flag is clear, or if in step 210 the IP multicast destination address, the IP source address, and if present, VLAN ID in the entry do not match the IP multicast destination address, IP source address, and if present, VLAN ID in the IP multicast packet, controller 112 performs another lookup (step 206) on bridge table 110 based on the lookup algorithm. If the lookup algorithm finishes with no entry matched (step 209), then controller 112 floods the Ethernet packet as destination address unknown (step 216) and optionally generates a message to CPU 104 requesting the creation of an entry in bridge table 110 for the IP multicast destination address, IP source address, and if present, VLAN ID (step 218). Of course, other techniques can be used for notifying CPU 104 and programming bridge table 110. In response, CPU 104 creates such an entry in bridge table 110, and sets the IP multicast flag for the entry. Then process 200 is done (step 214).

However, if at step 204 the Ethernet packet does not comprise an IP multicast packet, controller 112 determines whether the Ethernet packet comprises a Media Access Control (MAC) multicast packet (step 220) according to conventional techniques, preferably by examining the contents of the packet for a known bit pattern that identifies the packet as a MAC multicast packet.

If the Ethernet packet comprises a MAC multicast packet, then controller 112 generates a key based on the MAC multicast destination address, and if present, VLAN ID in the MAC multicast packet and performs a lookup (step 222) on bridge table 110 using the key, which can be generated according to conventional techniques, for example by hashing the MAC multicast destination address, and if present, VLAN ID using a hash function.

Controller 112 then confirms that the entry in bridge table 110 indicated by the key is not an IP multicast entry (step 224) by testing the IP multicast flag. Each MAC multicast entry contains an association between a MAC multicast destination address, an optional VLAN ID, and a port indicator that identifies one or more of the ports 114. The port indicator can be a vector comprising a bit representing each port 114, a list of identifiers of one or more ports 114, a pointer to such a port vector or port list, or the like.

If in step 224 controller 112 finds the IP multicast flag in the entry is clear, then controller 112 determines whether the MAC multicast destination address, and if present, VLAN ID in the entry match the MAC multicast destination address, and if present, VLAN ID in the MAC multicast packet (step 226). If they match, then controller 112 floods the Ethernet packet according to the port indicator in the entry (step 228), and process 200 is done (step 214).

However, if in step 224 the IP multicast flag is set, or if in step 226 the MAC multicast destination address, and if present, VLAN ID in the entry do not match the MAC multicast destination address, and if present, VLAN ID in the MAC multicast packet, controller 112 performs another lookup (step 222) on bridge table 110 based on the lookup algorithm. If the lookup algorithm finishes with no entry matched (step 225), then controller 112 floods the Ethernet packet as destination address unknown (step 230) and generates a new MAC multicast entry in bridge table 110 according to conventional methods, ensuring that the IP multicast flag for the entry is clear (step 232). Then process 200 is done (step 214).

If at step 220 the Ethernet packet comprises neither an IP multicast packet nor a MAC multicast packet, controller 112 floods the Ethernet packet normally, according to conventional techniques (step 234).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network switch comprising:
a memory configured to store a bridge table, wherein the bridge table is used to bridge a first network and a second network, and wherein the network switch is configured to communicate with the first network and the second network; and
a controller configured to determine whether an Ethernet packet received by the network switch from the first network or the second network is (i) an Internet Protocol (IP) multicast packet, or (ii) a media access control (MAC) multicast packet that does not encapsulate an IP multicast packet;

in response to the Ethernet packet being an IP multicast packet,
- generate a first key based on an IP multicast destination address and an IP source address associated with the Ethernet packet,
- lookup a first entry in the bridge table using the first key, and
- flood the Ethernet packet to one or more ports identified by the first entry in response to confirming that the first entry is an IP multicast entry; and in response to the Ethernet packet being a MAC multicast packet that does not encapsulate an IP multicast packet,
- generate a second key based on a MAC multicast destination address associated with the Ethernet packet,
- lookup a second entry in the bridge table using the second key, and
- flood the Ethernet packet to one or more ports identified by the second entry in response to confirming that the second entry is not an IP multicast entry.

2. The network switch of claim 1, wherein in response to the Ethernet packet being an IP multicast packet, the controller is further configured to flood the Ethernet packet to the one or more ports identified by the first entry in response to determining that an IP multicast destination address and an IP source address associated with the first entry matches the IP multicast destination address and the IP source address of the Ethernet packet.

3. The network switch of claim 1, wherein in response to the Ethernet packet being an IP multicast packet, the controller is configured to generate the first key by hashing the IP multicast destination address and the IP source address of the Ethernet packet.

4. The network switch of claim 1, wherein in response to the Ethernet packet being an IP multicast packet, and in response to the Ethernet packet including a virtual local area network identifier (VLAN ID), the controller is further configured to:
- generate the first key by hashing the VLAN ID, the IP multicast destination address, and the IP source address of the Ethernet packet, and
- flood the Ethernet packet to the one or more ports identified by the first key in response to a VLAN ID associated with the first entry matching the VLAN ID of the Ethernet packet.

5. The network switch of claim 1, wherein in response to the Ethernet packet being a MAC multicast packet that does not encapsulate an IP multicast packet, the controller is further configured to flood the Ethernet packet to the one or more ports identified by the second entry in response to determining that a MAC multicast destination address associated with the second entry matches the MAC multicast destination address of the Ethernet packet.

6. The network switch of claim 1, wherein in response to the Ethernet packet being a MAC multicast packet that does not encapsulate an IP multicast packet, the controller is configured to generate the second key by hashing the MAC multicast destination address of the Ethernet packet.

7. The network switch of claim 1, wherein in response to the Ethernet packet being a MAC multicast packet that does not encapsulate an IP multicast packet, and in response to the Ethernet packet including a virtual local area network identifier (VLAN ID), the controller is further configured to:
- generate the second key by hashing the VLAN ID and the MAC multicast destination address of the Ethernet packet, and
- flood the Ethernet packet to the one or more ports identified by the second key in response to a VLAN ID associated with the second entry matching the VLAN ID of the Ethernet packet.

8. A method comprising:
- storing a bridge table in a network switch, wherein the bridge table is used to bridge a first network and a second network, and wherein the network switch is configured to communicate with the first network and the second network;
- determining whether an Ethernet packet received by the network switch from the first network or the second network is (i) an Internet Protocol (IP) multicast packet, or (ii) a media access control (MAC) multicast packet that does not encapsulate an IP multicast packet;
- in response to the Ethernet packet being an IP multicast packet,
  - generating a first key based on an IP multicast destination address and an IP source address associated with an Ethernet packet;
  - performing a lookup on the bridge table and locating a first entry in the bridge table using the first key; and
  - flooding the Ethernet packet to one or more ports identified by the first entry in response to confirming, based on the first key, that the first entry is an IP multicast entry; and
- in response to the Ethernet packet being a MAC multicast packet that does not encapsulate an IP multicast packet,
  - generating a second key based on a MAC multicast destination address associated with the Ethernet packet,
  - performing a lookup on the bridge table and locating a second entry in the bridge table using the second key, and
  - flooding the Ethernet packet to one or more ports identified by the second entry in response to confirming that the second entry is not an IP multicast entry.

9. The method of claim 8, further comprising, in response to the Ethernet packet being an IP multicast packet, flooding the Ethernet packet to the one or more ports identified by the first entry in response to determining that an IP multicast destination address and an IP source address associated with the first entry respectively match the IP multicast destination address and the IP source address of the Ethernet packet.

10. The method of claim 8, further comprising, in response to the Ethernet packet being an IP multicast packet, generating the first key by hashing the IP multicast destination address and the IP source address of the Ethernet packet.

11. The method of claim 8, further comprising, in response to the Ethernet packet being an IP multicast packet, and in response to the Ethernet packet including a virtual local area network identifier (VLAN ID):
- generating the first key by hashing the VLAN ID, the IP multicast destination address, and the IP source address of the Ethernet packet; and
- flooding the Ethernet packet to the one or more ports identified by the first entry in response to a VLAN ID associated with the first entry matching the VLAN ID of the Ethernet packet.

12. The method of claim 5, further comprising, in response to the Ethernet packet being a MAC multicast packet that does not encapsulate an IP multicast packet, flooding the Ethernet packet to the one or more ports identified by the second entry in response to determining that a MAC multicast destination address associated with the second entry matches the MAC multicast destination address of the Ethernet packet.

13. The method of claim 8, further comprising, in response to the Ethernet packet being a MAC multicast packet that does not encapsulate an IP multicast packet, generating the second key by hashing MAC multicast destination address of the Ethernet packet.

14. The method of claim 8, further comprising, in response to the Ethernet packet being a MAC multicast packet that does not encapsulate an IP multicast packet, and in response to the Ethernet packet including a virtual local area network identifier (VLAN ID):

generating the second key by hashing the VLAN ID and the MAC multicast destination address of the Ethernet packet; and flooding the Ethernet packet to the one or more ports identified by the second entry in response to a VLAN ID associated with the second entry matching the VLAN ID of the Ethernet packet.

\* \* \* \* \*